UNITED STATES PATENT OFFICE.

HARRISON B. MEECH, OF TROY, NEW YORK.

IMPROVEMENT IN THE MANUFACTURE OF PAPER-PULP.

Specification forming part of Letters Patent No. 116,979, dated July 11, 1871.

*To all whom it may concern:*

Be it known that I, HARRISON B. MEECH, of Troy, in the county of Rensselaer and State of New York, (formerly of Fort Edward, New York,) have invented certain new and useful Improvements in the Manufacture of Paper-Pulp, of which the following is a specification:

My invention consists in the employment, for the manufacture of paper-pulp, of the plant *zizania aquatica*, otherwise known as Indian rice or water-oats. This is a tall and reed-like grass, with leaves almost as large as those of Indian corn. The upper part of the ample panicle bears pistillate flowers on erect club-shaped pedicels, the lower bearing staminate flowers on spreading branches, each flower or spikelet having only one pair of glumes, the outer one long-awned. The grain is slender, one-half inch long. This grass grows in marshes, and is found in large quantities in Canada and the Northwest. It costs much less than rye or wheat straw, now so generally used in the manufacture of paper, and it can be reduced to pulp with less expense, being nearly free from silica and gluten, and therefore requiring little or no alkali.

The process of pulping is as follows: The grass, in proper condition, is placed in any of the known vessels or boilers used for reducing paper-stock, and boiled from three to ten hours, more or less, in a weak solution of pure caustic alkali of about $\frac{1}{2}°$ Baumé, either with or without steam-pressure. The pulp is then bleached by any of the known processes. By grinding the stock at the same time it is boiling it can be pulped in soft water, and the pulp bleached for white or manufactured into brown paper.

I claim as my invention and desire to secure by Letters Patent—

1. The process of reducing *zizania aquatica* or water-oats to a pulp for the manufacture of paper, substantially as herein described.

2. A pulp for the manufacture of paper, obtained from *zizania aquatica* or water-oats by the process herein described, or its equivalent.

HARRISON B. MEECH.

Witnesses:
F. L. HODGMAN,
WALTER M. LANE.